United States Patent [19]

Itoh et al.

[11] 4,149,043

[45] Apr. 10, 1979

[54] CASSETTE TAPE RECORDER WITH RADIO RECEIVER

[75] Inventors: Satoshi Itoh, Nakaminato; Hideto Ueno, Katsuta; Katsuya Satoh, Mito, all of Japan

[73] Assignee: Hitachi, Ltd., Japan

[21] Appl. No.: 753,938

[22] Filed: Dec. 23, 1976

[30] Foreign Application Priority Data

Dec. 26, 1975 [JP] Japan .................................. 50-155035

[51] Int. Cl.² .......................... G11B 31/00; G11B 5/54
[52] U.S. Cl. ................................. 179/100.11; 325/311; 360/61; 360/105; 360/137
[58] Field of Search .................. 179/100.11; 325/311; 360/61, 105, 137

[56] References Cited

U.S. PATENT DOCUMENTS

| | | | |
|---|---|---|---|
| 3,560,666 | 2/1971 | Bookman | 179/100.11 |
| 3,612,777 | 10/1971 | Ban | 179/100.11 |
| 3,653,669 | 4/1972 | Sterly | 360/105 |
| 3,765,685 | 10/1973 | Harlan | 360/137 |
| 3,843,847 | 10/1974 | Sato | 179/100.11 |

Primary Examiner—Bernard Konick
Assistant Examiner—Alan Faber
Attorney, Agent, or Firm—Craig & Antonelli

[57] ABSTRACT

A cassette tape recorder with a radio receiver comprising a radio receiver system including an antenna, a tuner etc.; a tape recorder system including a magnetic head, motors etc.; an output system including variable resistors, speakers etc., which receives the audio signals from the radio receiving system or the tape recorder system; and a power source, wherein a switch is provided which is changed over by the operation of mounting a cassette on the tape recorder system and by the actuation of the temporary stopping mechanism so as to selectively connect the power source with the radio receiver system on the tape recorder system, whereby radio broadcasting can be received while the cassette is being mounted on the tape recording system.

6 Claims, 21 Drawing Figures

CASSETTE TAPE RECORDER WITH RADIO RECEIVER

BACKGROUND OF THE INVENTION

1. Field of the Invention

The present invention relates to a cassette tape recorder with a radio receiver adapted for use on an automobile and more particularly to an apparatus in which the operation of selecting between the radio receiver system and the tape recorder system is related to the actuation of the temporary stopping mechanism.

2. Description of the Prior Art

Recently, there has been an increasing demand that the audio apparatus carried on an automobile should be small in size and multifunctional and therefore there is a tendency toward the combination of a cassette tape recorder with a radio receiver.

Therefore, it is preferable in the design of such a combined audio apparatus to make the number of the parts of the mechanism and that of the elements of the circuits as small as possible and also to use a single component for plural purposes,. For example, one artifice is to use only one output system for the audio signal while the radio receiver system and the tape recorder system are separately provided as the input systems for the audio signal. As a result of this the number of the circuit elements to be used will be rendered smaller.

Conventionally, the selective operation in such a combined audio apparatus is performed by a switch which is changed over in accordance with the insertion and ejection of a cassette into and from the tape recorder. Namely, a power source is connected with the movable contact of the switch and when the cassette is inserted into the tape recorder, the switch is changed over to select the tape recorder so that power is supplied for the tape recorder system including magnetic heads, a motor etc. When the cassette is ejected from the tape recorder, the switch is changed over to select the radio receiver so that power is fed to the radio receiver system including an antenna, a tuner etc. Consequently, if one wants to change over the audio apparatus from the state of tape performance to the state of radio reception, he has to eject the cassette from the tape recorder. If one again wants to enjoy tape performance, the cassette has to be inserted again. This causes a little nuisance in manipulation. Especially, the driver has to be careful of where to place the ejected cassette so that the manipulation of the apparatus during driving rather disturbs safe driving. Therefore, such a conventional audio apparatus as described above is not adapted for use on an automobile.

SUMMARY OF THE INVENTION

One object of the present invention is to provide a cassette tape recorder with a radio receiver in which the selection between the operations of tape recorder and radio receiver can be made with a cassette kept inserted in the tape recorder so that the driver's manipulation may be much simplified.

Another object of the present invention is to provide a cassette tape recorder with a radio receiver which is small in size and economical and which attains the above object without increasing the number of parts.

The feature of the present invention is the provision of a switch changed over in accordance with the actuation of the temporary stopping mechanism and the operation of inserting the cassette into the tape recorder, in the cassette tape recorder with a radio receiver comprising a radio receiver system including an antenna, a tuner etc.; a tape recorder system including a magnetic head, a motor etc.; an output system including a variable resistor, a speaker etc., for receiving the audio signal from the radio receiver and the tape recorder systems; and a power source. The switch has its movable contact connected with the power source and when the head base plate carrying the magnetic head is shifted to the playing position after the cassette has been inserted into the tape recorder, the shift is detected to cause the switch to select the tape recorder system. As a result, the power source is connected with the tape recorder system to prepare the tape recorder system for performance.

The switch is also ganged with the temporary stopping mechanism and the actuation of the mechanism causes the switch to select the radio receiver system. Namely, the power source is connected with the radio receiver system, which in turn starts reproducing broadcast. The actuation of the temporary stopping mechanism causes the head base plate to shift backward. The design of this audio apparatus is such that the amount of the backward shift is insufficient for changing over the switch. In this way, each of the operations of the radio receiver and the cassette tape recorder can be selected with the cassette kept inserted in the tape recorder system.

Thus, the operation of changing over from tape recorder to radio receiver can be performed, according to the present invention, by simply actuating the temporary stopping mechanism whereas in the prior art system both the operation of ejecting the cassette and that of taking out the cassette from the tape recorder (including the operation of placing the withdrawn cassette in a suitable position) are required to change over a from tape recorder system a to radio receiver system. The present invention is therefore very advantageous in view of safe driving.

Furthermore, according to the present invention, the mechanical parts are so rationally and multifunctionally used that the overall size can be reduced. Other objects, features and advantages of the present invention will be apparent when one reads the following description of the specification in conjunction with the attached drawings.

BRIEF DESCRIPTION OF THE DRAWINGS

FIGS. 4 to 7 illustrate the process of inserting a cassette into the tape recorder.

DETAILED DESCRIPTION OF THE PREFERRED EMBODIMENTS

(1) Insertion of Cassette

Figure 1:
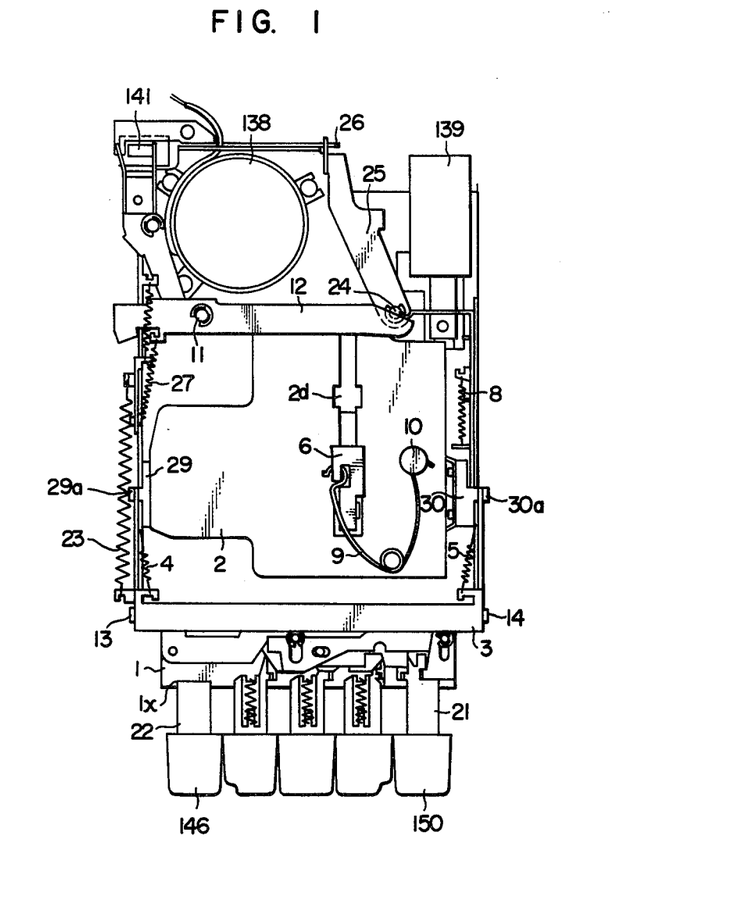
FIG. 1 is a plan of a cassette tape recorder with a radio receiver according to the present invention, with its casing removed.
Figure 2:
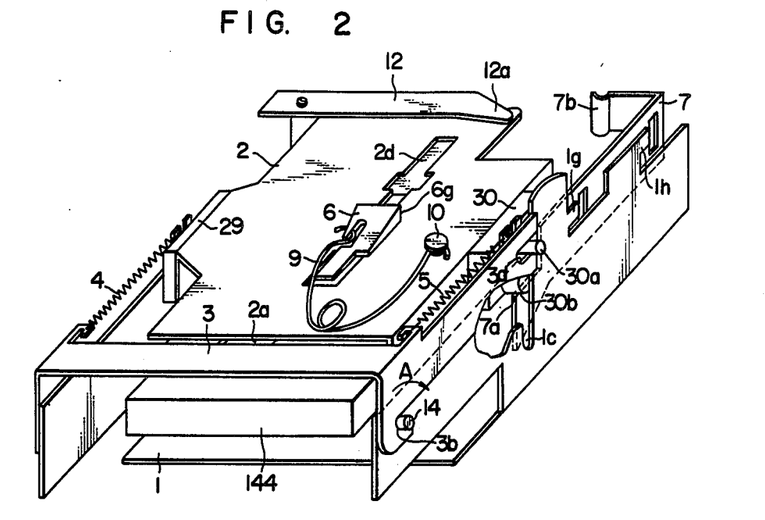
FIG. 2 is a perspective view of the principal portion of the audio apparatus shown in FIG. 1.
Figure 3:
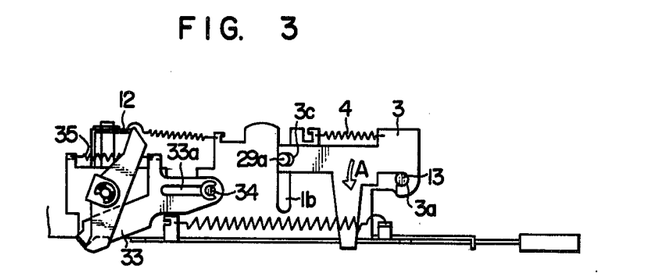
FIG. 3 is a side view, as viewed from leftward, of the principal portion of the apparatus in FIG. 1.

In FIGS. 1 to 3, a chassis 1 is in the shape of flat-bottomed U, having narrow side walls perpendicular to the main wall. A cassette housing 2 has up/down slidable members 29 and 30 on both sides thereof and the protrusions 29a and 30a of the up/down slidable members 29 and 30 slide up and down along the sliding slots 1b and 1c cut in the side walls of the chassis 1. An up/down shifting member 3 has U-shaped slots 3a and 3b, which are slidably engaged about the shafts 13 and 14 erected on the external faces of the side walls of the chassis 1. The up/down shifting member 3 is urged in the direction indicated by an arrow A. The protrusions 29a and 30a of the up/down slidable members 29 and 30 are fitted respectively in the U-shaped slots 3c and 3d of the up/down shifting member 3 so that the up/down shifting member 3 is related to the upward and downward movements of the cassette housing 2. A cassette shifting member 6 moves sliding along the oblong slot 2d of the cassette housing 2.

Figure 4:
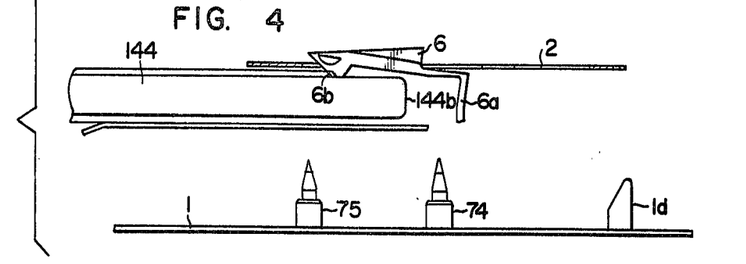
FIGS. 4 and 5 being side views, as viewed from rightward, of the principal portion of the apparatus shown in FIG. 1, FIG. 6 a rightward side view of an important portion, and FIG. 7 a leftward side view of another important portion.
Figure 5:
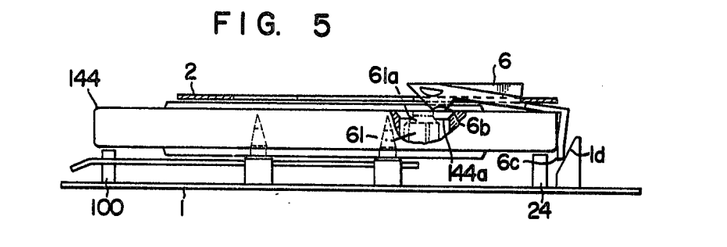
Figure 6:
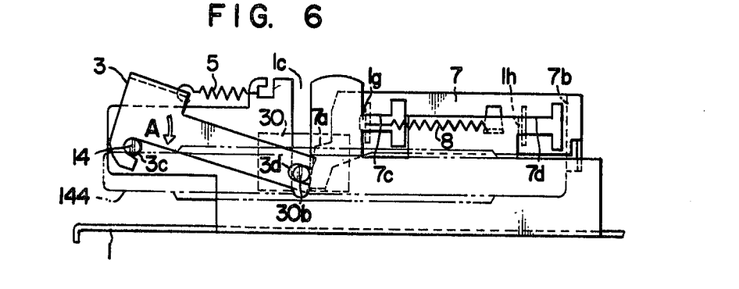

Now, if a cassette 144 is inserted through the mouth 2a of the cassette housing 2 (see FIG. 2), the forward end 144b (see FIG. 4) of the cassette 144 pushes up the sloping surface of the projection 6b of the cassette shifting member 6. When the cassette 144 is further inserted, the projection 6b abuts against the top surface of the cassette 144 while the cassette 144 is shifted deeper into the cassette housing 2. Then, the end 144b of the cassette 144 pushes the end wall 6a of the cassette shifting member 6 and the projection 6b of the cassette shifting member 6 is received in the reel shaft hole 144a of the cassette 144 (see FIG. 5). A tumbler spring 9 is anchored at both ends to the cassette shifting member 6 and a pin 10 erected on the cassette housing 2. In the early stage of insertion, the cassette 144 is shifted inward against the resisting force of the tumbler spring 9, but when the anchoring points 6 and 10 move relatively from their positions at which the distance between them is the minimum, the cassette 144 is automatically shifted inward by the urging force of the spring 9. Accordingly, the forward end 144b of the cassette 144 pushes the projection 7b of a stopping member 7 against the resisting force of a spring 8, the stopping member 7 sliding under the guide of the tabs 1g and 1h (see FIGS. 2 and 6) of the side wall of the chassis 1, so that the stopper 7a of the stopping member 7 is disengaged from the sliding projection 30a located at the bottom end of the up/down slidable member 30 (see FIG. 6). Consequently, the cassette 144 is shifted down vertically due to the weight of the cassette housing 2 and due to the rotational force in the direction A of the up/down shifting member 3 established by the springs 4 and 5. The cassette 144 is then located in place by cassette locating pins 74 and 75 (see FIG. 11) and shafts 24 and 100 erected on the chassis 1. Here, as shown in FIG. 5, the edge 6c of the end wall of the cassette shifting member 6 abuts against the sloping edge 1d of the tab of the chassis 1 so that the projection 6b of the member 6 is lifted up so as not to be engaged with the clutch 61a of a turntable 61 mounted on the chassis 1. The insertion of the cassette 144 is thus completed.

(2) Shift of Head Base Plate

When the cassette 144 is shifted down, the lower surface 144c of the cassette 144 pushes down against a torsion spring 135 the protrusion 134b of a stopper plate 134 for a head base plate, the head base plate being journaled on a shaft 142 received in the slots of the tabs 1n and 1p of the chassis 1 and urged clockwise by the torsion spring 135. Consequently, the edge 134a of the stopper plate 134 is disengaged from the edge 43f of the head base plate 43 carrying thereon a magnetic head 58.

The head base plate 43 is slidable leftward and rightward under the guide of a guide pin 50 (see FIG. 11) erected on the chassis 1 and the associated slot 43a of the head base plate 43 and of a pin 51 (see FIG. 11) erected downward on the head base plate 43 and the associated guide slot 1a of the chassis 1. A swingable arm 123, which rotates about a shaft 131 (see FIG. 12) erected on the chassis 1, is journaled at its end on the pin 51 and has its remaining end anchored to a spring 124 so as to be urged in the direction indicated by an arrow B. Therefore, when the head base plate 43 is disengaged from the stopper plate 134 as described above, the head base plate 43 slides in the direction C (see FIG. 11) due to the compression force of the spring 124 until it reaches the playing position. A slide switch 141 (see FIG. 11) has its change-over lever 28 swingably supported on a shaft 70 erected on the chassis 1 and the tab 43b of the head base plate 43 is engaged with the slot 28a of the change-over lever 28. The movement of the head base plate 43 in the direction C causes the counterclockwise swing of the change-over lever 28. As a result, the slide switch 141 is changed over from radio receiver to tape recorder by means of an elastic member 28b provided on the change-over lever 28 so that power is supplied for the tape recording system.

(3) Two-directional Constant Speed Tape Feeding Mechanism

A motor 138 (see FIG. 12), mounted on the chassis 1 for driving magnetic tape, drives flywheels 36 and 37 via a pulley 129 fixed on the shaft thereof, a first drive belt 130 and a pulley 132 rotatably supported on the shaft 131, and the magnetic tape is fed forward or backward at a constant speed by means of capstan shafts 72 and 73 (see FIG. 11) coaxial with the flywheels 36 and 37 and pinch rollers 46 and 47. The pinch rollers 46 and 47 are rotatably supported on pinch roller arm 44 and 45 which are journaled on shafts 54 and 55 erected on the head base plate 43. The flywheel 36 has a major wheel 36b and a minor wheel 36a each having a groove for a drive belt. The rotating motion is transmitted from the pulley 129 of the motor 138 through the pulley 132 to the major wheel 36b of the flywheel 36. The speed of the rotating motion is reduced by means of the minor wheel 36a of the flywheel 36 and further transmitted through a second drive belt 133 to a take-up pulley 67. The flywheels 36 and 37 are rotatably supported by a support plate 38 (FIG. 13) and the tolerance in the thrusting direction of the flywheels are adjustable by a adjusting screw 38a. The rotating force of the take-up pulley 67 (FIG. 12) is transmitted to the cogged periphery 62b of the turntable 62 through a take-up gear 63 (FIG. 11) arranged coaxially in frictional engagement with the pulley 67 in the case of the forward constant speed feeding of magnetic tape and to the cogged periphery 61b of the turntable 61 through the cogged periphery 59a of an idling gear 59 journaled on a shaft 60 erected on the chassis 1 and always engaged with the turntable 61 in the case of the backward constant speed feeding of magnetic tape.

Figure 14:
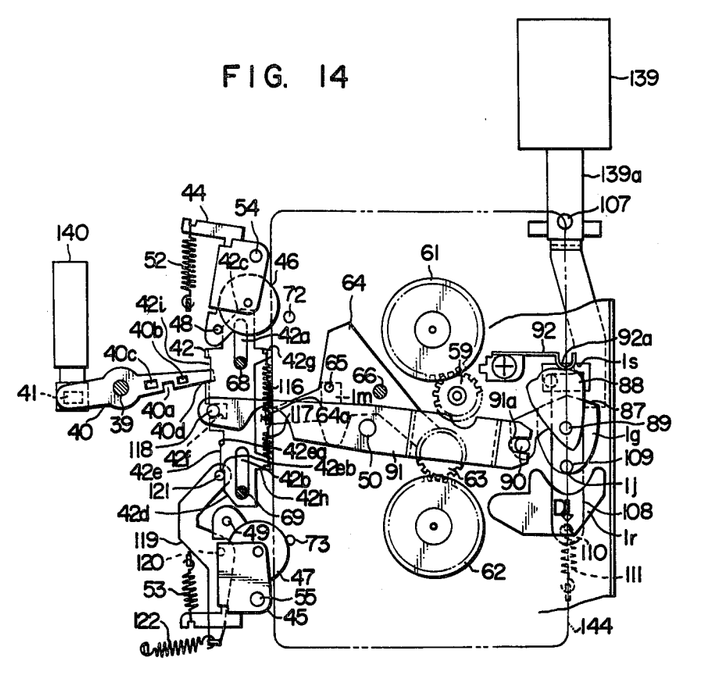
FIG. 14 is a plan of a principal portion showing a two-directional reproduction mechanism and the associated change-over mechanism.

In the forward constant feeding, as shown in FIG. 14, the pinch roller 47 is urged against the capstan 73 by a spring 53 while the pinch roller 46 is kept apart from the capstan 72 since a pin 48 erected on a pinch roller holder 44 is urged clockwise in FIG. 14 by the edge 42c of the slidable switching member 42. In the backward constant feeding, the pinch roller 46 is urged against the capstan 72 by a spring 52 while the pinch roller 47 is kept apart from the capstan 73 since a pin 49 erected on a pinch roller holder 45 is urged counterclockwise by the edge 42d of the slidable switching member 42.

(4) Two-directional Constant Feed Change-over Mechanism

Figure 15:
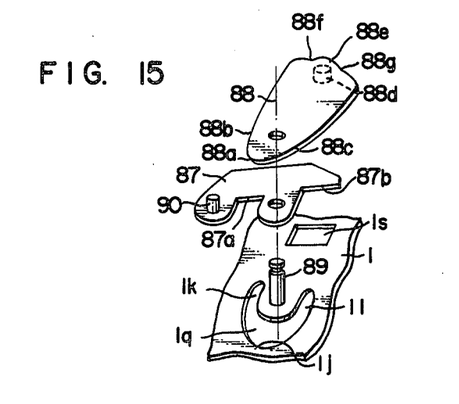
FIG. 15 is an exploded view of an important portion in the mechanism shown in FIG. 14.

The slidable switching member 42 (FIG. 14) slides reciprocatively since the oblong slots 42a and 42b receive guide pins erected on the chassis 1. The sliding movement of the member 42 causes the unbalance in the forces of springs 116 and 117 anchored between the tab 64a of the take-up gear holder 64 carrying thereon the take-up gear 63 and the coaxial take-up pulley 67 (at the center of FIG. 13) and the tab 42g of the slidable switching member 42 and between the tabs 64a and 62h. Accordingly, the differential force of the springs 116 and 117 due to the unbalance rotates the take-up gear holder 64 journaled on a shaft 66 erected on the chassis 1 so that the take-up gear 63 is engaged with the cogged periphery 62b or 59a of the turntable 62 or the idling gear 59, as described above. In order to maintain the uniform engagement between the take-up gear and the turntable or the idling gear, the abutting edge of a hole 1m cut in the chassis 1 limits the movement of a pin 65 erected downward on the take-up gear holder 64. The movement of the slidable switching member 42 is caused by attracting a core bar 139a into a solenoid 139. The core bar 139a is attracted by the direct energization of the solenoid 139 or the indirect energization of the solenoid 139 through the magnetic influence of magnetic discs 112 and 113 (FIG. 12) on reed relays 114 and 115 mounted near the discs on the chassis, the magnetic discs 112 and 113 being coaxial with and rotating together with the turntables 61 and 62, respectively. The core bar 139a is provided with a switching gang member 108 journaled on a pin 107. The gang member 108 has pins 109 and 110 erected thereon and the pin 110 is always urged in the direction D by means of a spring 111. The biasing force causes the pin 109 to rest at the edge 1j of a hole 1g cut in the chassis 1. Now, reference should be had to FIG. 15 showing an enlarged and exploded view. A switching rotary member 87 and a switching guide member 88 are journaled on a shaft 89 erected on the chassis 1. A switching swing member 91 is journaled on a shaft 50 erected on the chassis 1 and the pin 90 erected on the switching rotary member 87 is received in the U-shaped slot 91a of the switching swing member 91. In the case of the forward feeding of magnetic tape (FIG. 14), when the solenoid 139 is energized and therefore when core bar 139a and the switching rotary member 108 is attracted against the urging force of the spring 111, the pin 109 of the switching gang member 108 is guided toward the slot 1k by the tapering edge 88a of the switching guide member 88 and abuts against the edge 88b of the switching guide member 88 and the edge 87a of the switching rotary member 87 to rotate the members 87 and 88 clockwise. When the solenoid 139 is deenergized, the switching gang member 108 is returned to the resting position described above by the urging force of the spring 111. The clockwise rotation of the switching rotary member 87 causes the pin 90 to rotate the switching swing member 91 about the shaft 50 counterclockwise so that the pin 118 erected on the switching swing member 91 acts on the engaging slot 42f of the slidable switching member 42 (see bottom of FIG. 14). Consequently, the edge 42d of the member 42 pushes up the pin 49 of the pinch roller holder 45 and the pinch roller 47 is separated from the capstan 73 to switch over the tape feed to the backward feeding state.

If the solenoid 139 is again energized, the pin 109 of the switching gang member 108 is guided toward the slot 1l of the chassis 1 by the tapering edge 88a of the switching guide member 88 and abuts against the edge 88c of the member 88 and the edge 87b of the switching rotary member 87, just opposite to the case of the forward tape feeding, to rotate the members 87 and 88 counterclockwise. When the solenoid 139 is deenergized, the switching gang member 108 is returned to its resting position, as described above. The counterclockwise rotation of the switching rotary member 87 causes the pin 90 to rotate the switching swing member 91 about the shaft 50 clockwise so that the pin 118 of the member 91 acts on the slot 42f of the slidable switching member 42 to push up the pin 48 of the pinch roller holder 44 by the edge 42c of the member 42. Consequently, the pinch roller 46 is separated from the capstan 72 to switch over the tape feed to the forward feeding state (FIG. 14).

As described above, each time the solenoid 139 is energized, the tape feed is switched over from forward feeding state to backward feeding state or conversely. In this case, the pin 88d erected downward on the switching guide member 88 abuts against the right or left side edge of the hole 1s of the chassis 1 (FIG. 15) and the bent end portion 92a of a strip spring 92 is urged against the notch 88f or 88g cut near the edge 88e of the switching guide plate 88 to fix the position of the member 88. Therefore, even when the solenoid 139 is deenergized and the switching gang member 108 is returned to its resting position, the switching guide member 88 is still kept at the position assumed before the deenergization of the solenoid 139. A stopper 119 (FIG. 14) for the slidable switching member 42 is journaled on a shaft 120 erected on the chassis 1 and always urged clockwise by a spring 122. Accordingly, the pin 121 of the stopper 119 is engaged with the side edge 42ea or 42eb of the protruding portion 42e of the slidable switching member 42 so that the member 42 is fixed in the forward or backward tape feeding state. Consequently, even though the solenoid 139 is deenergized and the switching gang member 108 is returned to its resting position, the slidable switching member is kept fixed.

An operating plate 40 is journaled on a shaft 39 erected on the chassis 1 and a pin 41 for switching a slide switch 140 on and off is erected on the operating plate 40. The end 40d of the operating plate 40 is engaged with the recess 42i of the slidable switching member 42. When the slidable switching member 42 is shifted to and fro, the slide switch 140 is accordingly turned on and off to switch over the head cores of the magnetic head to be kept in contact with the magnetic tape.

(5) Temporary Stopping Mechanism

Figure 11:
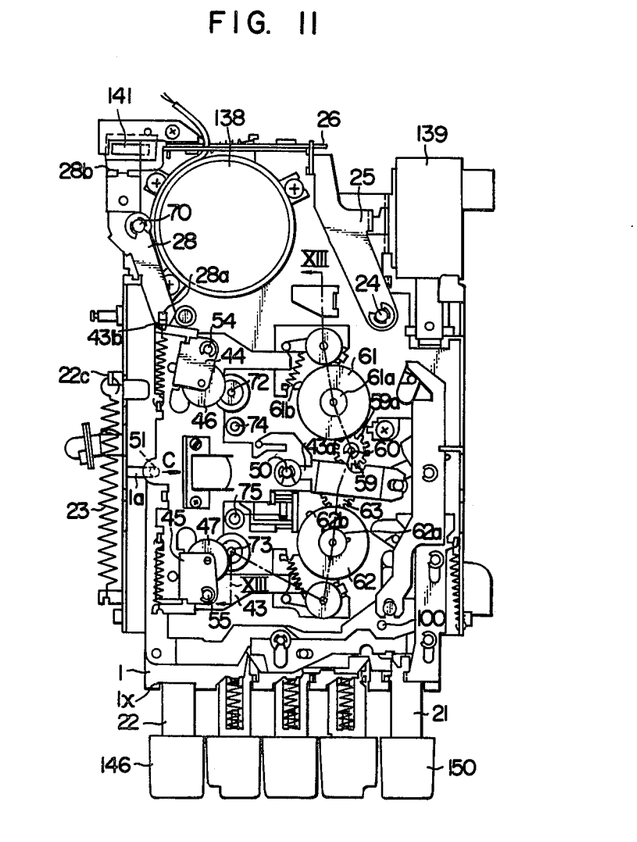
FIG. 11 is a plan of a tape drive mechanism.
Figure 12:
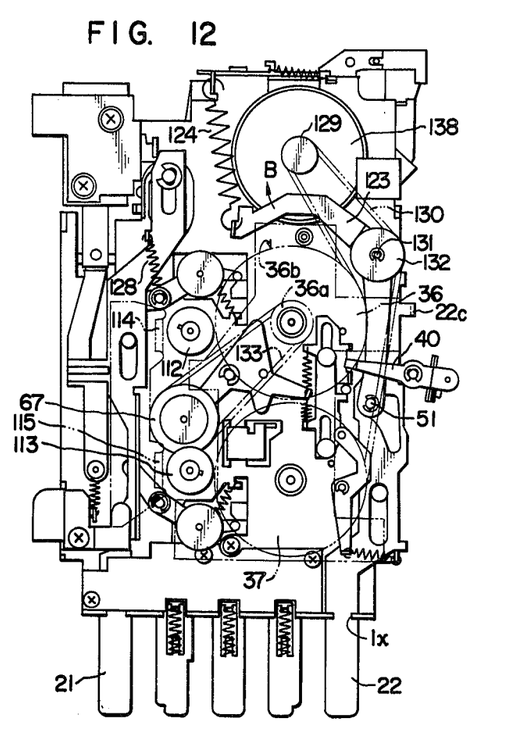
FIG. 12 is a bottom view of the tape drive mechanism.
Figure 13:
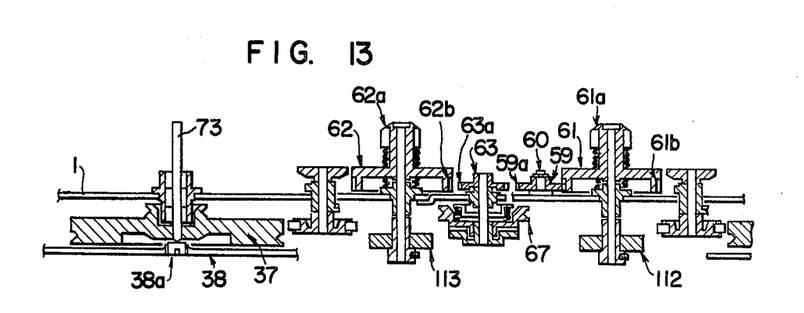
FIG. 13 is a cross section taken along line XIII—XIII in FIG. 11.
Figures 16, 17:
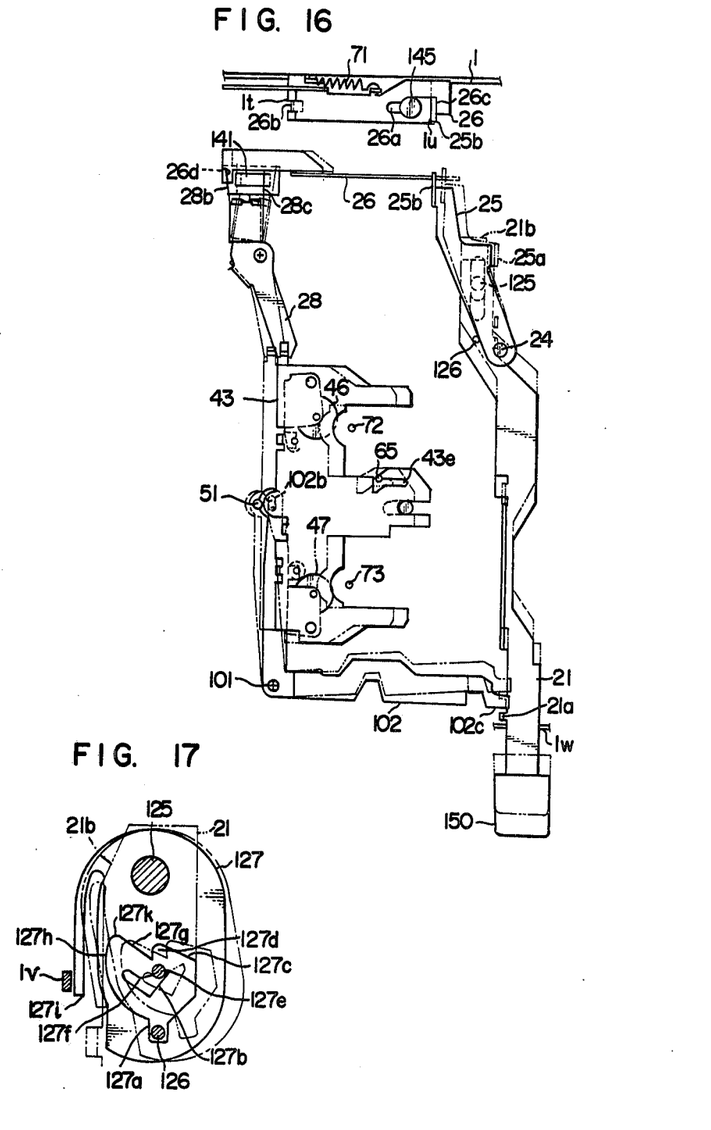
FIG. 16 is a plan of a principal portion, showing a temporary stopping mechanism.
FIG. 17 is a bottom view of a cam means used in the temporary stopping mechanism.

In the constant speed tape feeding state as shown in FIG. 11, when the button 150 attached to a temporary stopping slide plate 21 is pushed, the plate 21 is shifted forward, guided by the guide hole 1w (FIG. 16) of the chassis 1 and a shaft 125 erected on the chassis 1, against the urging force of a spring (FIG. 12). When the slide plate 21 is in the restored position, the pin 126 of the plate 21 is engaged with the slot 127a of a pause lock cam 127 (FIG. 17) journaled on the shaft 125 so that the lock cam 127 is prevented from rotating. The lock cam 127 is pressed from top by the slide plate 21. If the temporary stopping slide plate 21 is pushed, the pin 126 pushes the sloping edge 127b of the pause lock cam 127 to rotate the cam 127 clockwise. The elastic piece 127i formed integrally on the cam 127 abuts and is urged against the tab 1v of the chassis 1 so that elastic energy is conserved in the elastic piece 127i. As the pin 126 advances past the projection 127e up to the edge 127c, the pause lock cam 127 is rotated counterclockwise by the urging force of the elastic piece 127i. The edge 127d abuts against the pin 126 and the pin 126 is shifted toward its initial position by the urging force of a spring 128. As a result, the pin 126 is guided by the inner sloping edge of the projection 127e and received by a locking notch 127f. Then, the sloping edge 21b of the temporary stopping slide plate 21 pushes the bent portion 25a of the temporary stopping lever 25 journaled on the shaft 24 erected on the chassis 1 so that the lever 25 is rotated clockwise about the shaft 24, as shown by an alternate long and two short dash line in FIG. 16.

A temporary stopping slider 26 (see the partial rear view at top of FIG. 16) is always urged leftward by a spring 71, guided by a shaft 145 erected on the chassis 1 and a slot 26a cut in the slider 26 and by a slot 1t cut in the chassis 1 and a tab 26b raised from the slider 26. However, the end 25b of the temporary stopping lever 25 is interposed between the end 1u of the chassis 1 and the edge 26c of the temporary stopping slider 26 so that the slider 26 is prevented from being shifted leftward by the urging force of the spring 71.

As the temporary stopping lever 25 rotates clockwise due to the urging force by the temporary stopping slide plate 21, the bent portion 25b of the lever 25 pushes the edge 26c of the slider 26 rightward and shifts the slider rightward so that the left end portion 26d of the slider 26 changes over the switch 141 from tape recorder to radio receiver.

Figure 18:
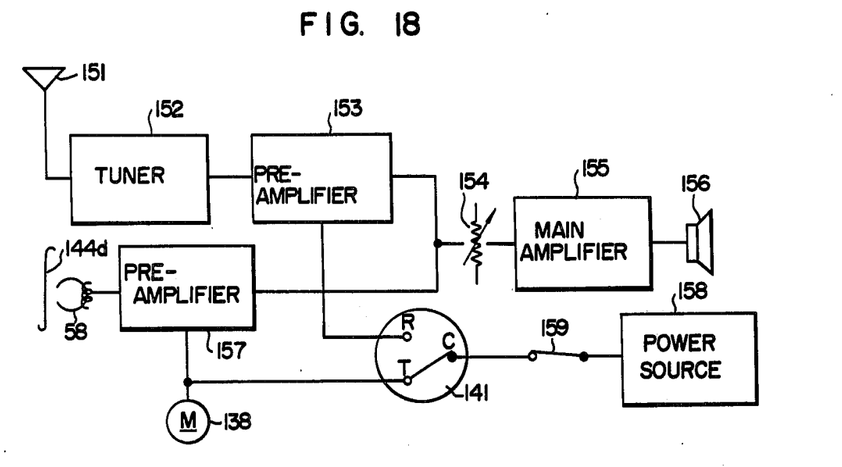
FIG. 18 is a block diagram of a cassette tape recorder with a radio receiver as an embodiment of the present invention.

FIG. 18 is a block diagram of a tape recorder with a radio receiver according to the present invention, comprising a radio receiver system consisting of an antenna 151, a tuner 152 and a preamplifier 153; a tape recorder system consisting of a magnetic head 58 for picking up the audio signal from the magnetic tape 144d of the cassette 144, a preamplifier 157 and a motor 138; an output system consisting of a variable resistor 154 for controlling the audio signals from the two systems, a main amplifier 155 and a speaker 156; and a power supply system consisting of a power source 158, a main switch 159 and the switch 141 described before.

With this structure, the insertion of the cassette 144 into the tape recorder system for tape performance causes the head base plate 43 to slide so that the movable contact C of the switch 141 is changed over from the terminal R of the radio receiver system to the terminal T of the tape recorder system due to the shift of the head base plate 43. Consequently, the power from the source 158 is supplied for the tape recorder system. If the temporary stopping slide plate 21 is then pushed to attain the temporary stop, the switch 141 is changed over by the cooperation of the temporary stopping slide plate 21, the temporary stopping lever 25 and the temporary stopping slider 26 so that the radio receiver system is selected.

Figure 19:
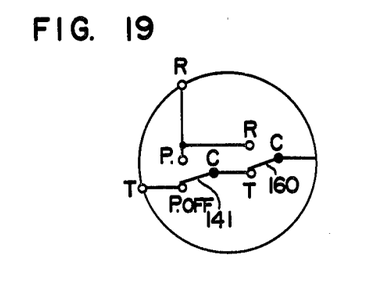
FIG. 19 shows a circuit as another embodiment of the switch used in FIG. 18.

FIG. 19 shows another embodiment of the switch 141, in which the movable contact C is connected with the power source and which comprises a first switch 160 for selecting the tape recorder system by detecting the operation of inserting a cassette into the tape recorder system and a second switch 141 for selecting the radio receiver system by detecting the operation of the temporary stopping mechanism. This modified switch has the same function as the switch 141 shown in FIG. 18.

Incidentally, when the temporary stopping slide plate 21 is shifted, the tab 21a of the slide plate 21 pushes the end 102c of an L-shaped swing arm 102 journaled on a shaft 101 erected on the chassis 1 so that the arm 102 rotates counterclockwise. Accordingly, the oblong slot 102b at the other end of the swing arm 102 shifts the head base plate 43 from playing to non-playing position, the pin 65 of the take-up gear holder 64 is guided into the slot 43e of the head base plate 43, the take-up gear 63 is shifted to the neutral position, and the pinch rollers 46 and 47 are separated from the capstans 72 and 73. In this case, the shift of the head base plate 43 is accompanied by the clockwise rotation of a switch change-over lever 28, but the distance between a pair of elastic members 28b and 28c provided at the end of the lever 28 is so appropriately designed that the switch 141 may not be changed over by the return shift of the head base plate 43. This configuration is important since the head base plate 43 makes a return shift also in the fast feed of magnetic tape.

Next, in the case of releasing the temporary stop, when the button 150 attached to the temporary stopping slide plate 21 is pushed again (see FIG. 16), the pin 126 engaged with the locking notch 127f of the pause lock cam 127 is disengaged and shifted forward so that the pin 126 pushes the sloping edge 127g to rotate the pause lock cam 127 counterclockwise. If the pushing force is removed from the temporary stopping slide plate 21 when the pin 126 is prevented from advancing by the edge 127k, the slide plate 21 makes a return shift by the urging force of the spring 128. Consequently, the pin 126 is shifted back along the curved edge 127h of the pause lock cam 127 into the slot 127a and simultaneously the temporary stopping lever 25, the temporary stopping slider 26 and the switch 141 are restored to the initial positions to release the temporary stop.

(6) Stop and Ejection of Cassette

Figure 7:
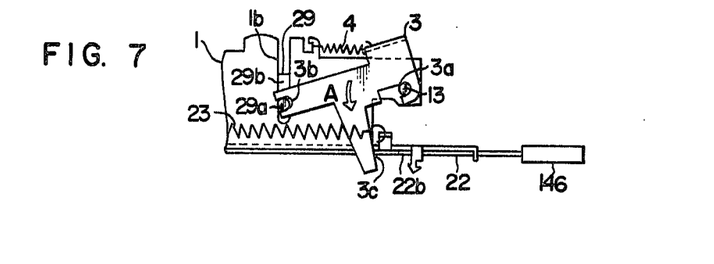
Figure 8:
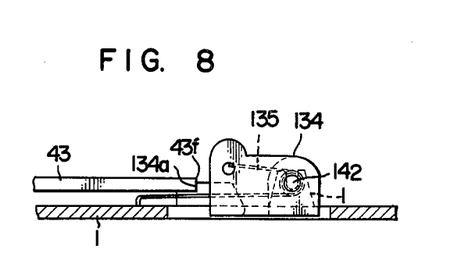
FIGS. 8 and 10 are partial cross sections of the chassis of the tape recorder.
Figure 9:
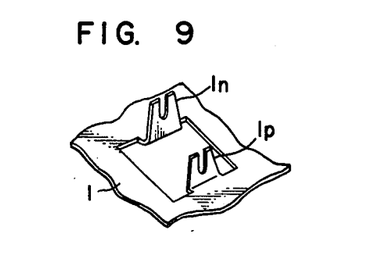
FIG. 9 is a partial perspective view of the chassis.
Figure 10:
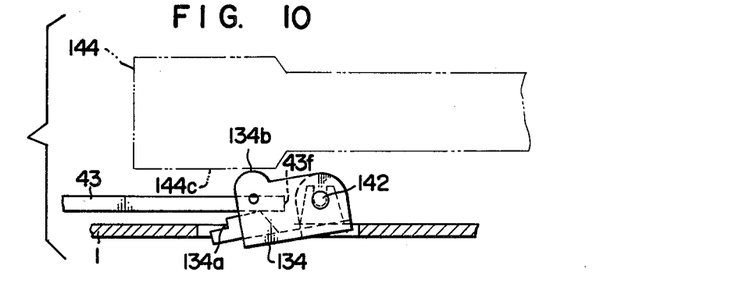
Figure 20:
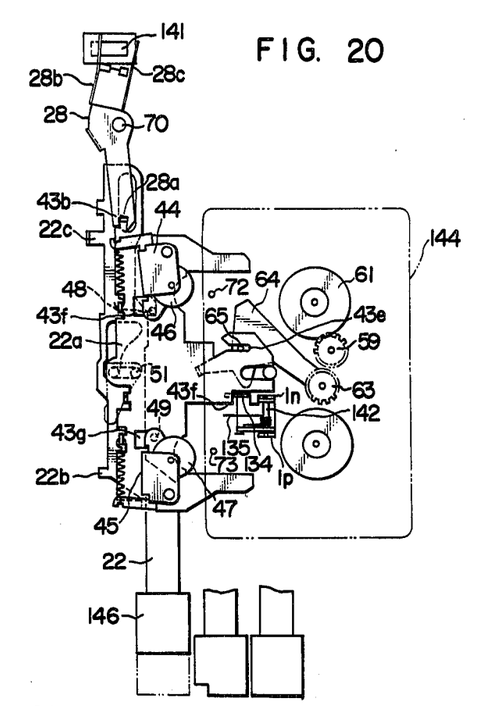
FIG. 20 is a plan of a principal portion, showing a stopping mechanism.

In the constant speed tape feeding state (FIG. 11), if it is desired to stop the tape performance, the button 146 attached to the end of a stop-and-eject slide plate 22 should be pushed. The stop-and-eject slide plate 22 is always urged by the spring 23 anchored to the tab 22c of the plate 22 and is slidable by being guided by the hole 1x of the chassis 1 and a shaft 131 (FIG. 12) erected on the chassis 1. When the button 146 is pushed against the urging force of the spring 23, the sloping edge 22a (FIG. 20) of the central hole of the stop-and-eject slide plate 22 pushes the pin 51 of the head base plate 43 so that the pin 51 is shifted along the sloping edge 22a. Consequently, the head base plate 43 is shifted to the stop position among the non-playing positions. If the slide plate 22 is further thrusted, the pinch roller 47 (46) is separated from the capstan 73 (72) as described above. And when the magnetic head 58 is separated accordingly from the cassette 144, the tab 22b of the slide plate 22 pushes the protrusion 3c of the up/down shifting member 3 to rotate the member 3 (FIG. 7). A further thrust of the slide member 22 causes the up/down shifting member 3 to rotate about the shaft 13 in FIG. 7 (the shaft 14 in FIG. 6) clockwise (counterclockwise) against the urging force of the spring 4 (5). Accordingly, the projection 29a (30a) of the up/down slidable member 29 (30) is shifted up, the cassette housing 2 is shifted from the playing position to the quasi-playing position, and the cassette 144 is lifted up to the ejectable position. Then, the stopping member 7 makes a return shift due to the restoring force of the spring 8 so that the stopper 7a blocks the projection 30b of the up/down slidable member 30. At the same time, the forward end 144b of the cassette 144 is pushed back by the projection 7b of the stopping member 7. Accordingly, the projection 6b of the cassette shifting member 6 is pushed up by the edge of the reel shaft hole 144a of the cassette 144 and then the cassette 144 is shift back by a distance equal to the return shift of the stopping member 7 while the projection 6b rests on the upper surface of the cassette 144.

Figure 21:
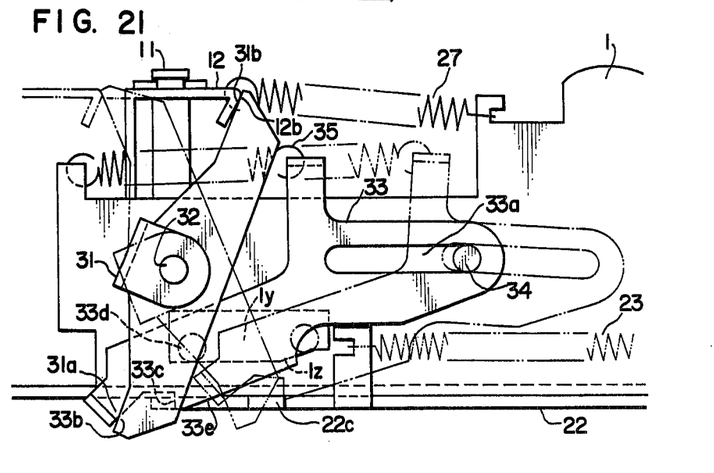
FIG. 21 is a leftward side view corresponding to FIG. 1, showing a cassette ejecting mechanism.

The operation of ejecting a cassette from the tape recorder system will now be described with the aid of FIG. 21. A cassette ejecting member 12 is journaled on a shaft 11 erected on the chassis 1 and one end of the member 12 is located on the upper surface of the cassette housing 2 while the other end is urged by a spring 27 to cause the member 12 to rotate counterclockwise, as shown in FIG. 1. An ejection swing member 31 is journaled on a shaft 32 erected on the chassis 1 and the end portion 31b of the ejection swing member 31 abuts against the end portion 12b of the cassette ejecting member 12 to cancel the urging force of the spring 27, that is, to prevent the rotation of the cassette ejecting member 12. An ejection sliding member 33 has an oblong slot 33a, which receives a guide pin 34 erected on the chassis 1. The ejection sliding member 33 can slide along and rotate about the guide pin 34. The member 33 has a pin 33d slidable along the edge 1z of the hole 1y of the chassis 1. The bent portion 33b of the member 33 abuts against the end portion 31a of the ejection swing member 31 to prevent the member 31 from rotating. The member 33 is leftward urged by a spring 35 as shown in FIG. 21. When the button 146 attached to the stop-and-eject slide member 22 is pushed, the member 22 is shifted forward to retreat the head base plate 43 from the playing position. And the cassette housing 2 with the cassette 144 therein is lifted by the up/down shifting member 3 up to the position where the cassette 144 can be ejected. When the stop-and-eject slide member 22 is completely shifted forward to its maximum depth while the tab 22c of the member 22 is urging up the edge 33e of the ejection sliding member 33, the tab 22c of the member 22 is received in the recessed portion 33c of the member 33. The above-mentioned retrogression of the head base plate 43 from the playing position causes the stopping member 134 to rotate clockwise due to the urging force of the spring 135 so that the stopper 134a of the member 134 is engaged with the edge 43f of the head base plate 43. Then, the switch 141 is changed over from tape recorder system to radio receiver system by the elastic member 28b of the change-over lever 28.

If the force on the button 146 is released after the stop-and-eject slide member 22 has been fully pushed in, the member 22 along with the ejection sliding member 33 is returned to its initial position by the restoring force of the spring 23. At this time, the bent portion 33b pushes the end portion 31a of the ejection swing member 31 to cause the ejection sliding member 33 to rotate counterclockwise. Consequently, the other end 31b of the member 31 pushes the end portion 12b of the cassette ejecting member 12 to cause the member 12 to rotate clockwise as seen in FIGS. 1 and 2. The cassette ejecting member in turn pushes by its end portion 12a (FIG. 2) the end 6g of the cassette shifting member 6 against the urging force of the tumbler spring 9 so that the cassette shifting member 6 is shifted to the initial position to eject the cassette 144.

The ejection sliding member 33, shifted together with the stop-and-eject slide plate 22, is lifted up since the pin 33d of the member 33 is guided up by the sloping edge 1z of the hole 1y of the chassis at the time of the finish of ejection. As a result, the tab 22c is disengaged from the recessed portion 33c, as shown by long and two short dash line in FIG. 21. The ejection sliding member 33 is therefore returned to the position as indicated by solid line in FIG. 21 by the urging force of the spring 35. Consequently, the cassette ejecting member 12 is also returned to the initial position.

We claim:

1. A cassette tape recorder with a radio receiver, comprising a radio receiver system;

a tape recorder system including therein a chassis having a housing for receiving a cassette therein, a head base plate carrying a magnetic head thereon and attached slidably to said chassis, a shifting mechanism for guiding said cassette into said housing when it is inserted and for sliding said head base plate from the stop position of the non-playing positions where said cassette is kept apart from said magnetic head, to the playing position where said magnetic head is in contact with the magnetic tape in said cassette, and a motor;

a power source;

a switch having a movable contact connected with said power source and a first and a second stationary contact to be selected by said movable contact, said first stationary contact being connected with said radio receiver system and said second stationary contact being connected with said tape recorder system;

a change-over means for connecting said movable contact with said second stationary contact of said switch when said cassette is guided into said housing by said shifting member and for connecting said movable contact with said first stationary contact of said switch when said cassette is ejected from said housing; said cassette tape recorder being characterized by the provision of a temporary stopping mechanism, the actuation of which with an inserted cassette causes said head base plate and magnetic head thereon to be shifted to said non-playing position so that the magnetic head is spaced from a tape of the cassette and also causes said movable contact of said switch to be changed over to said first stationary contact.

2. A cassette tape recorder with a radio receiver, as claimed in claim 1, wherein said switch consists of a first and a second switch;

said first switch having a movable contact connected with said power source, a first stationary contact connected with said radio receiver system and a second stationary contact, said movable contact being changed over to said second stationary contact when said cassette is guided into said housing by said shifting mechanism and to said first stationary contact when said cassette is ejected from said housing; and said second switch having a movable contact connected with said second stationary contact of said first switch, a first stationary contact connected with said radio receiver system and a second stationary contact connected with said tape recorder system, said movable contact of said second switch being changed over to said first stationary contact of said second switch when said temporary stopping mechanism is actuated and to said second stationary contact of said second switch when said temporary stopping mechanism is not actuated.

3. A cassette tape recorder with a radio receiver, comprising a radio receiver system;

a tape recorder system including therein a chassis having a housing for receiving a cassette therein, a head base plate carrying a magnetic head thereon and attached slidably to said chassis, a shifting mechanism for guiding said cassette into said housing when it is inserted and for sliding said head base plate from the stop position of the non-playing positions where said cassette is kept apart from said magnetic head, to the playing position where said magnetic head is in contact with the magnetic tape in said cassette, and a motor; and a power source; said cassette tape recorder being characterized by further comprising a temporary stopping slide member for shifting said head base plate from the playing position to the non-playing position when said head base plate is held at the playing position;

a cam means for holding said slide member at the operating position and the non-operating position alternately in response to the response to the repeated actuation of said slide member;

a temporary stopping lever to be shifted in connection with said slide member;

a switch having a movable contact connected with said power source, a first stationary contact connected with said radio receiver system and a second stationary contact connected with said tape recorder system, said movable contact being connected with said first stationary contact by the actuation of said temporary stopping lever when said slide member is at the operating position, and said movable contact being connected with said second stationary contact when said slide member is at the non-operating position, and a change-over lever having a first and a second elastic member for acting upon said switch at one end thereof, and being shifted when said head base plate is shifted to the playing position, said first elastic member causing said movable contact to touch said second stationary contact when said head base plate is at the playing position, said second elastic member causing said movable contact to touch said first stationary contact when said head base plate is at the stop position, and said second elastic member not changing over said switch when said head base plate is shifted by said temporary stopping mechanism.

4. A cassette tape recorder with a radio receiver, comprising a radio receiver system;

a tape recorder system at least including therein a cassette mounting mechanism for guiding a cassette to the playing position thereof in accordance with the operation of inserting said cassette into said tape recorder and for sliding a head base plate carrying a magnetic head thereon from the stop position to the playing position thereof in accordance with said inserting operation, a cassette ejecting mechanism for sliding said head base plate from the playing position thereof to the stop position in accordance with the operation of ejecting said cassette and for guiding said cassette from the playing position thereof to the withdrawing position in accordance with said ejecting operation, and a temporary stopping mechanism for sliding said head base plate and magnetic head thereon from the playing position thereof to a temporary stop position such that with an inserted cassette and upon actuation of the temporary stopping mechanism, the magnetic head is spaced from a tape of the cassette;

a power source;

a switch having a movable contact connected with said power source and a first and a second stationary contact to be selected by said movable contact, said first stationary contact being connected with said radio receiver system and said second stationary contact being connected with said tape recorder system;

a first change-over means for connecting said movable contact with said second stationary contact of said switch when said cassette is guided to the playing position by said cassette mounting mechanism and for connecting said movable contact with said first stationary contact of said switch when said cassette is guided from the playing position to the withdrawing position; and a second change-over means interposed between said temporary stopping mechanism and said first change-over means for connecting said movable contact of said switch with said first stationary contact when said head base plate is shifted from the playing position to the temporary stop position in accordance with the operation of said temporary stopping mechanism.

5. A cassette tape recorder with a radio receiver, as claimed in claim 4, wherein said switch comprises a first and a second switch;

said first switch having a movable contact connected with said power source and a first and a second stationary contact to be selected by said movable contact, said first stationary contact being connected with said radio receiver system, said movable contact being changed over to said second stationary contact when said cassette is guided to the playing position by said cassette mounting mechanism and to said first stationary contact when said cassette is guided from the playing position to the withdrawing position; and said second switch having a movable contact connected with said second stationary contact of said first switch and a first and a second stationary contact to be selected by said movable contact, said first stationary contact being connected with said radio receiver system and a second stationary contact being connected with said tape recorder system, said movable contact of said second switch being changed over to said first stationary contact of said second switch by means of said second change-over means when said temporary stopping mechanism is actuated and to said second stationary contact of said second switch when said temporary stopping mechanism is not actuated.

6. A cassette tape recorder with a radio receiver, as claimed in claim 4, wherein said first change-over means has a first and a second elastic member for acting upon said switch in an alternative direction and is shifted when said head base plate is shifted, said first elastic member causing said movable contact to touch said second stationary contact when said head base plate is at the playing position, said second elastic member causing said movable contact to touch said first stationary contact when said head base plate is at the stop position.

* * * * *